H. A. AMELUNG.
MANUFACTURE OF LARD AND TALLOW.

No. 3,827. Patented Nov. 13, 1844.

H. A. AMELUNG.
MANUFACTURE OF LARD AND TALLOW.

No. 3,827. Patented Nov. 13, 1844.

ized fix
UNITED STATES PATENT OFFICE.

H. A. AMELUNG, OF ST. LOUIS, MISSOURI.

PREPARING LARD.

Specification of Letters Patent No. 3,827, dated November 13, 1844.

*To all whom it may concern:*

Be it known that I, HENRY A. AMELUNG, of the city of St. Louis and State of Missouri, have invented a new and useful Improvement in Manufacturing Lard and Tallow; and I do hereby declare that the following is a full and exact description thereof, reference being had to the accompanying drawing, which forms a part of this description, in which—

Figure 1:
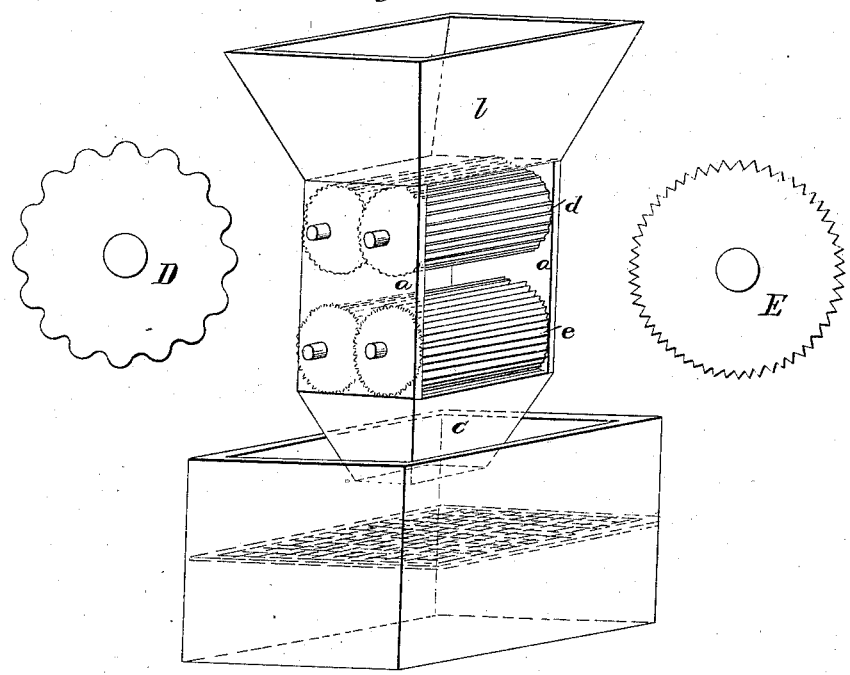
Figure 2:
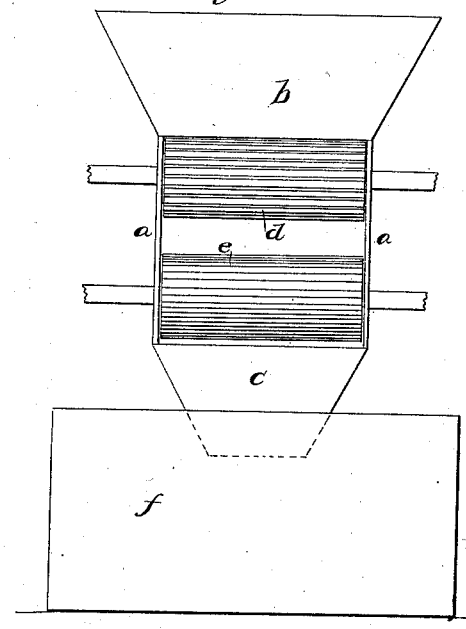
Figure 3:
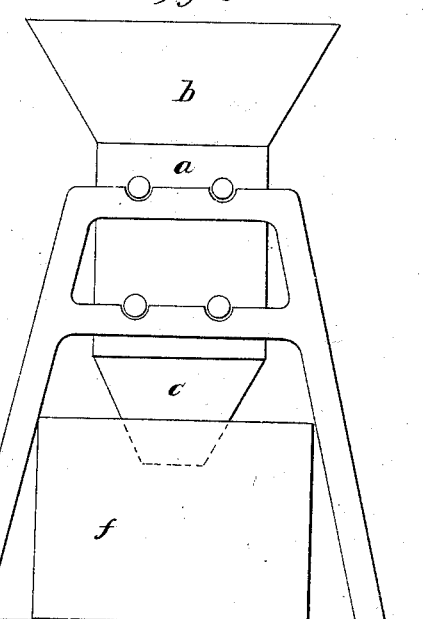
Figure 1:
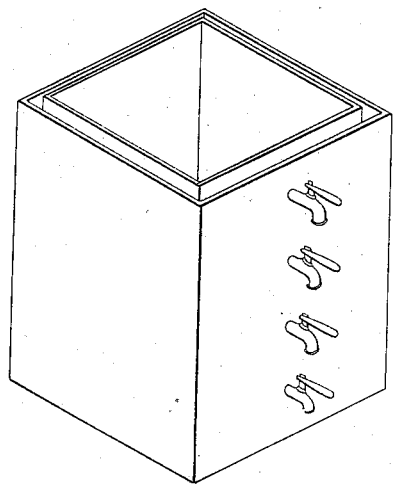
Figure 4:
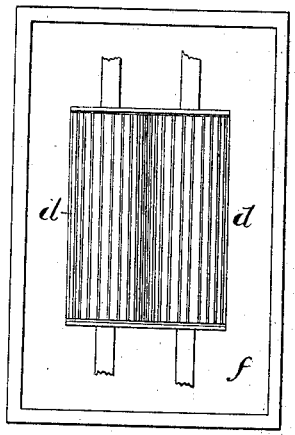
Figure 2:
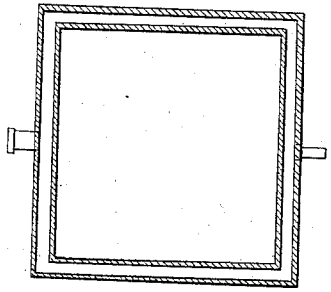
Figure 3:
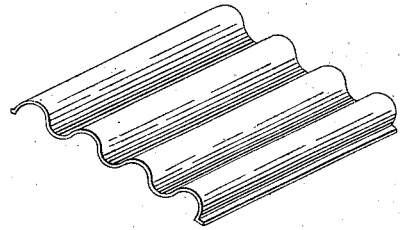

Plate 1, Figure 1, is a perspective view of the roller apparatus. Fig. 2, is a side elevation. Fig. 3, an end elevation; Fig. 4, plan with hopper removed. Plate 2, Fig. 1, is a perspective view of a double reservoir or steam chest. Fig. 2, is a plan of the same. Fig. 3, shows the manner in which the bottoms can be formed of corrugated sheet metal.

The nature of my invention consists in the process of manufacturing lard or extracting animal fats in large quantities in a pure state, so that the fat shall be entirely cooked; which is not the case in the old processes of rendering lard, by cutting the fat in small pieces and cooking by steam or over a fire; in my process I extract the lard from the fibrin and other animal matter, and then cook it, by which the whole mass is more equally prepared and rendered less liable to turn rancid or grow oily than by any means now known. In constructing the machines for this purpose two flat iron plates $a$, are fastened perpendicularly to the bottom of a hopper $b$, parallel to each other and opposite their lower ends are terminated with a similar, but smaller hopper $c$. In the upper ends of the plates $a$, near the bottom of the hopper $b$, are boxes for the journals of two horizontal rollers $d$, to run in these rollers are on a level with and work into each other their surfaces being reeded as shown in the large cross section D, below. The rollers should be about 30 inches in length and 15 inches in diameter, the depth of the channels between the reeds is $2\frac{1}{2}$ inches; these proportions can of course be varied.

Under the rollers $d$, are two others $e$, parallel with them about ten inches in diameter, and about the same length as the upper ones. These have their surface grooved with triangular channels longitudinally as shown in enlarged Fig. E, below, said channels being about $\frac{3}{4}$ inch in depth.

Below the lower hopper $c$, there is a wooden vat $f$, six feet by four, and 2 deep, about the middle of the height of this vat there is a riddle or sieve shown by dotted lines at $f'$, Fig. 1.

The operation of this machine is as follows: The fat is put into the upper hopper $b$ and as the roller, $d$, revolves it is drawn in between them it is pressed it is then received between the second pair of rollers $e$, the grooves of which are finer and which are set nearer together and they act more forcibly on the fat than the first pair and squeeze out all the fat which after being expressed falls together with the fibrin and other gummy foreign matter into the vat $f$ below onto the sieve $f'$, the lower rollers have about three times the speed given to them that the upper ones have to run through the same amount of fat; from which the oil and pulpy fat sinks into the lower division of the vat $f$ leaving the fibrin &c., above, and if this mass is agitated by a wooden shovel or otherwise the oil and fat will be abstracted more effectually. If it is then thrown into a warm water bath the oil and fat will separate entirely from fibrin and albumin &c. After the pure oil or fat is washed from the impurities it is placed in the steam vat shown Plate 2, Fig. 1. This vat consists of an outer and inner case having a space between them into the inner one, the fat is put and steam is let into the outer one between them thus employing the dry heat of steam to cook the fat contained in the inner vat. This is drawn off through a stop cock near the bottom and the steam is admitted through a pipe in the usual way from the boiler in the space between the two jackets; this process evaporates all the watery particles that were mixed with the fat, and leaves the oil pure. The fibrin is then put into kettles over a fire adding a little water occasionally until all the oil or fat is abstracted that may be attached to it when it is strained off into the vat represented in plate 2, Figs. 1 and 2. This process will yield from five to seven per ct. more lard than any other process now known and the quantity of second quality of lard is greatly reduced.

Having thus fully described my process of manufacturing lard, &c., what I claim therein as new and desire to secure by Letters Patent is—

The process herein described of obtaining fat from the fibrin, &c., before it is cooked, and afterward cooking the expressed fat in the manner described, by which the danger of injury to the lard by cooking it with its impurities is obviated, and a much purer article obtained as well as a saving effected.

H. A. AMELUNG.

Witnesses:
  T. C. DONN,
  J. J. GREENOUGH.